US008989402B2

(12) United States Patent
Boemer et al.

(10) Patent No.: US 8,989,402 B2
(45) Date of Patent: Mar. 24, 2015

(54) USE OF SENSORS FOR NOISE SUPPRESSION IN A MOBILE COMMUNICATION DEVICE

(75) Inventors: Leopold Boemer, San Diego, CA (US); Xianxian Zhang, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 686 days.

(21) Appl. No.: 13/151,977

(22) Filed: Jun. 2, 2011

(65) Prior Publication Data

US 2012/0183154 A1    Jul. 19, 2012

Related U.S. Application Data (60) Provisional application No. 61/434,280, filed on Jan. 19, 2011.

(51) Int. Cl.
*G10L 21/0208* (2013.01)
*H04N 11/00* (2006.01)
*H04B 15/02* (2006.01)

(52) U.S. Cl.
CPC ...................................... *H04B 15/02* (2013.01)
USPC ............................ 381/94.1; 381/94.7; 381/56

(58) Field of Classification Search
CPC ........... G10K 11/1784; G10K 11/1786; H04R 3/005; H04R 29/004; H04R 29/005
USPC ................. 381/56, 57, 58, 71.1, 71.11, 71.14, 381/71.2, 71.4, 71.6, 71.8, 92, 94.1, 94.2, 381/94.3, 94.7, 74; 455/570
See application file for complete search history.

(56) References Cited

U.S. PATENT DOCUMENTS

| 2009/0106708 A1* | 4/2009 | Dagher et al. ..................... 716/1 |
| 2009/0238377 A1* | 9/2009 | Ramakrishnan et al. ....... 381/92 |
| 2009/0268933 A1* | 10/2009 | Baechler ....................... 381/318 |
| 2010/0046770 A1* | 2/2010 | Chan et al. ..................... 381/92 |
| 2011/0144984 A1* | 6/2011 | Konchitsky .................... 704/226 |
| 2011/0182436 A1* | 7/2011 | Murgia et al. ................ 381/71.1 |
| 2011/0299695 A1* | 12/2011 | Nicholson ................... 381/71.6 |
| 2012/0057717 A1* | 3/2012 | Nystrom ...................... 381/71.6 |

OTHER PUBLICATIONS

"Quiet Comfort® 3 Acoustic Noise Cancelling® headphones", retrieved from <http://www.bose.com/controller?url=/shop_online/headphones/noise_cancelling_headphones/quietcomfort_3/index.jsp> on Jun. 2, 2011, 1 page.

(Continued)

*Primary Examiner* — Vivian Chin
*Assistant Examiner* — William A Jerez Lora
(74) *Attorney, Agent, or Firm* — Fiala & Weaver P.L.L.C.

(57) ABSTRACT

Techniques are described herein that use sensors (e.g., microphones) for noise reduction in a mobile communication device. For example, one technique enables a first sensor that is initially configured to be a speech sensor to be used as a noise reference sensor. This technique also enables a second sensor that is initially configured to be a noise reference sensor to be used as a speech sensor. Another technique enables a primary sensor and/or a secondary sensor in a handset of a mobile communication device to be used as a speech sensor while a sensor in a headset of the mobile communication device is used as a noise reference sensor, or vice versa. In yet another technique, a secondary sensor in a mobile communication device is configured to be a directional sensor.

20 Claims, 5 Drawing Sheets

(56) References Cited

OTHER PUBLICATIONS

"Quiet Comfort® 15 Acoustic Noise Cancelling® headphones", retrieved from <http://www.bose.com/controller?url=/shop_online/headphones/noise_cancelling_headphones/quietcomfort_15/index.jsp> on Jun. 2, 2011, 1 page.
"Digital Noise Cancelling Headphones MDR-NC500D", retrieved from <http://www.sonystyle.com/webapp/wcs/stores/servlet/ProductDisplay?catalogId=10551&storeId=10151&langId=-1&productId=8198552921665348955> on Jun. 2, 2011, 2 pages.
"Noise Canceling Headphones—HA-NC250", retrieved from <http://av.jvc.com/product.jsp?modelId=MODL028174&pathId=101&page=1> on Jun. 2, 2011, 1 page.
"MOTOPURE H15 Universal Flip Bluetooth Headset", retrieved from <http://www.motorola.com/consumers/v/index.jsp?vgnextoid=5bc550f71985c110VgnVCM1000008406b00aRCRD&%3bamp%3bvgnextchannel=b49932a609e89110VgnVCM1000008406b00aRCRD> on Jun. 2, 2011, 1 page.
"Bluetooth® Headset H780", retrieved from <http://www.motorola.com/consumers/US-EN/Bluetooth-Headset-H780-US-EN.do?vgnextoid=618fdeb51076c110VgnVCM1000008406b00aRCRD> on Jun. 2, 2011, 1 page.
"Uniden BT229, Bluetooth Cellular Headset", retrieved from <http://uniden.com/products/productdetail.cfm?product=BT229&filter=cellularheadset> on Jun. 2, 2011, 1 page.
"Andrea Electronics BT-200 Noise Canceling Bluetooth Headset", retrieved from <http://www.andreaelectronics.com/Buy/ProductDesc/BT200.htm> on Jun. 2, 2011, 3 pages.
"Nokia 6720 classic phone" retrieved from <http://mea.nokia.com/find-products-en/devices/nokia-6720-classic/specifications> on Jun. 2, 2011, 2 pages.
"LG phone with DSE dual-mic algorithm", Noise-Cancelling Phones, ces 2009, retrieved from <http://www.geek.com/articles/mobile/ces-2009-lg-announces-noise-cancelling-phones-2009017/> on Jun. 2, 2011, 6 pages.
"theBoom Pro1", noise cancelling headset, retrieved from <http://www.theboom.com/ProductDetails.asp?ProductCode=520> on Jun. 2, 2011, 2 pages.
"theBoom E", noise cancelling headset with single eartube, retrieved from <http://www.theboom.com/ProductDetails.asp?ProductCode=787> on Jun. 2, 2011, 2 pages.
"theBoom Pro2", noise cancelling headset, retrieved from <http://www.theboom.com/ProductDetails.asp?ProductCode=530> on Jun. 2, 2011, 2 pages.
"theBoom "C" with on/off toggle", noise cancelling headset, retrieved from <http://www.theboom.com/ProductDetails.asp?ProductCode=580> on Jun. 2, 2011, 2 pages.
"theBoom "O" with on/off toggle", noise cancelling headset, retrieved from <http://www.theboom.com/ProductDetails.asp?ProductCode=559> on Jun. 2, 2011, 2 pages.
"theBoom v4", noise cancelling headset, retrieved from <http://www.theboom.com/ProductDetails.asp?ProductCode=550> on Jun. 2, 2011, 3 pages.

\* cited by examiner

USE OF SENSORS FOR NOISE SUPPRESSION IN A MOBILE COMMUNICATION DEVICE

CROSS-REFERENCE TO RELATED APPLICATIONS

This application claims the benefit of U.S. Provisional Application No. 61/434,280, filed Jan. 19, 2011, the entirety of which is incorporated by reference herein.

BACKGROUND OF THE INVENTION

1. Field of the Invention

The invention generally relates to noise suppression.

2. Background

Headphones and headsets (referred to collectively hereinafter as "headsets") that include noise reduction functionality are intended to provide greater speech and/or music quality in noisy environments. Such headsets (referred to hereinafter as "noise reduction headsets") may be used in conjunction with telephones (e.g., cellular phones, landline phones, or voice-over-internet-protocol (VoIP) phones), computer dictation devices, portable music players, etc. For example, the headsets may be used during air travel to listen to music or for making phone calls while driving. When the headsets are used, any microphones that are included in the underlying devices to which the headsets are attached traditionally are disabled.

Noise reduction headsets that are used for purposes of communication often include a primary microphone (a.k.a. a speech microphone) for detecting speech of a user and a secondary microphone (a.k.a. a noise reference microphone) for detecting noise that may interfere with accuracy of the detected speech. A signal that is received by the primary microphone is referred to as a primary signal. In practice, the primary signal usually includes a speech component (e.g., a user's speech) and a noise component (e.g., background noise). A signal that is received by the secondary sensor is referred to as a secondary signal. The secondary signal usually includes reference noise (e.g., background noise), which may be combined with the primary signal to provide a speech signal that has a reduced noise component, as compared to the primary signal.

More recently, mobile communication device handsets have been developed that include noise reduction functionality. Such handsets often include a primary microphone and a secondary microphone that function as described above with reference to noise reduction headsets. However, any microphones that are included in the handsets traditionally are disabled when headsets are used in conjunction with the handsets.

The relatively close proximity of a primary microphone and a secondary microphone in either a handset or a headset may result in distortion of a speech signal upon performance of a noise reduction operation. For example, the primary signal may include some aspects of reference noise, and/or the secondary signal may include some aspects of the speech signal. In accordance with this example, performance of the noise reduction operation may remove a portion of a speech component of the speech signal. Also, incorporating noise reduction functionality (e.g., a secondary microphone, other hardware, and/or software) into a headset often increases complexity and/or cost of the headset.

BRIEF SUMMARY OF THE INVENTION

A system and/or method for using sensors (e.g., microphones) for noise reduction in a mobile communication device, substantially as shown in and/or described in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, using sensors (e.g., microphones) for noise reduction in a mobile communication device. The noise reduction techniques described herein use such sensors in ways that are not contemplated by conventional noise reduction techniques. For example, one approach enables a first sensor that is initially configured to be a speech sensor to be used as a noise reference sensor. This approach also enables a second sensor that is initially configured to be a noise reference sensor to be used as a speech sensor. Another approach enables a primary sensor and/or a secondary sensor in a handset of a mobile communication device to be used as a speech sensor while a sensor in a headset of the mobile communication device is used as a noise reference sensor. Yet another approach enables a primary sensor and/or a secondary sensor in a handset of a mobile communication device to be used as a noise reference sensor while a sensor in a headset of the mobile communication device is used as a speech sensor. In still another approach, a secondary sensor in a mobile communication device is configured to be a directional sensor.

An example mobile communication device is described that includes a headset and a handset. The headset includes a first sensor configured to detect a first audio signal for a first duration that includes a designated time period. The handset is communicatively coupled to the headset. The handset includes second sensor(s) and a processor. The second sensor(s) are configured to detect a second audio signal for a second duration that includes the designated time period. The processor is configured to compare a portion (e.g., all or less than all) of a representation of the first audio signal that corresponds to the designated time period and a portion (e.g., all or less than all) of a representation of the second audio signal that corresponds to the designated time period to determine a noise-reduced signal. The representation of the first audio signal may be unchanged from the first audio signal that is detected by the first sensor. Alternatively, the representation of the first audio signal may be a modified (e.g., filtered) version of the first audio signal that is detected by the first sensor. The representation of the second audio signal may be unchanged from the second audio signal that is detected by the second sensor(s). Alternatively, the representation of the second audio signal may be a modified (e.g., filtered) version of the second audio signal that is detected by the second sensor(s). The noise-reduced signal represents a difference between the portion of the representation of the first audio signal and the portion of the representation of the second audio signal.

An example handset of a mobile communication device is described. The handset includes a first sensor, a second sensor, and a processor. The first sensor is configured to be proximate a mouth of a user during operation of the handset by the user. The second sensor is configured to be distal the mouth of the user during the operation of the handset by the user. The processor is configured to switch the first sensor and the second sensor between a first mode of operation and a second mode of operation. The first mode is characterized by the first sensor being configured as a primary sensor to detect a first primary signal that represents speech of the user. The first mode is further characterized by the second sensor being configured as a secondary sensor to detect a first secondary signal that represents reference noise. The second mode is characterized by the first sensor being configured as a secondary sensor to detect a second secondary signal that represents reference noise. The second mode is further characterized by the second sensor being configured as a primary sensor to detect a second primary signal that represents sound from a targeted noise source. The processor is configured to subtract a representation of the first secondary signal from a representation of the first primary signal to provide a noise-reduced first primary signal in response to the first sensor and the second sensor being switched from the second mode to the first mode. The processor is configured to subtract a representation of the second secondary signal from a representation of the second primary signal to provide a noise-reduced second primary signal in response to the first sensor and the second sensor being switched from the first mode to the second mode. The representations of the first primary signal, first secondary signal, second primary signal, and/or second secondary signal may be changed or unchanged from the respective first primary signal, first secondary signal, second primary signal, and/or second secondary signal as detected by the sensor(s).

Another example handset of a mobile communication device is described. The handset includes a first sensor, a second sensor, and a processor. The first sensor is configured to be distal a mouth of a user during operation of the handset by the user. The first sensor is further configured to detect a first audio signal for a first duration that includes a designated time period. The first sensor is a directional sensor that emphasizes sound received from a specified direction more than sound received from directions other than the specified direction. The second sensor is configured to be proximate the mouth of the user during operation of the handset by the user. The second sensor is further configured to detect a second audio signal for a second duration that includes the designated time period. The processor is configured to compare a portion (e.g., all or less than all) of a representation of the first audio signal that corresponds to the designated time period and a portion (e.g., all or less than all) of a representation of the second audio signal that corresponds to the designated time period to determine a noise-reduced signal. The representation of the first audio signal may be changed or unchanged from the first audio signal that is detected by the first sensor. The representation of the second audio signal may be changed or unchanged from the second audio signal that is detected by the second sensor. The noise-reduced signal represents a difference between the portion of the representation of the first audio signal and the portion of the representation of the second audio signal.

An example method is described for reducing noise in a mobile communication device that has first and second opposing surfaces. In accordance with this example method, an image of a targeted object is captured using a camera that is configured on the first surface. A first audio signal from a first sensor that is configured on the first surface and a second audio signal from a second sensor that is configured on a surface of the mobile communication device other than the first surface are received contemporaneously. The first audio signal represents sound provided by the targeted object. The second audio signal represents sound provided by objects other than the targeted object. The image of the targeted object is displayed using a display that is configured on the second surface. A representation of the second audio signal is subtracted from a representation of the first audio signal to provide a noise-reduced representation of the first audio signal. The representation of the first audio signal may be changed or unchanged from the first audio signal that is received from the first sensor. The representation of the second audio signal may be changed or unchanged from the second audio signal that is received from the second sensor.

The noise reduction techniques described herein have a variety of benefits as compared to conventional noise reduction techniques. For instance, the techniques described herein may reduce distortion of a primary or speech signal and/or reduce noise (e.g., background noise, babble noise, etc.) that is associated with the primary or speech signal more than conventional techniques. The techniques described herein may increase accuracy of voice activity detection (VAD), especially in relatively noisy environments. A handset of a mobile communication device may be placed in relatively close proximity to a noise source for detection of reference noise, and a headset (e.g., wireless headset) of the mobile communication device may be placed in relatively close proximity to a speech source (e.g., a user's mouth) for detection of speech. The techniques described herein may utilize any (e.g., all) of the sensors that are included in a mobile communication device for reducing noise.

II. Example Noise Reduction Embodiments

Figure 1A:
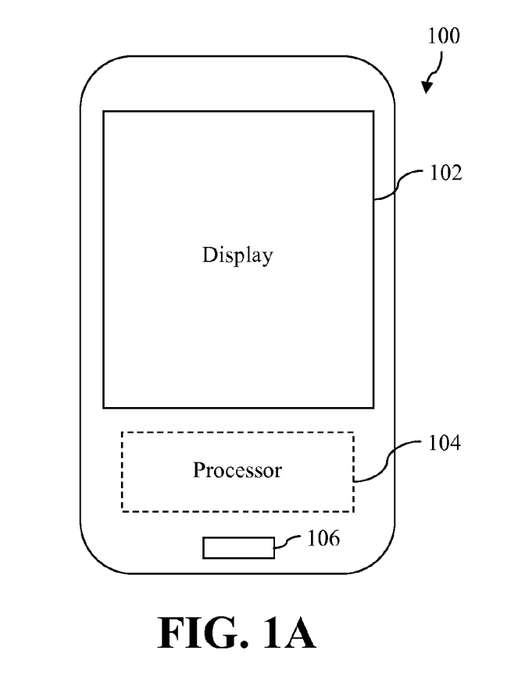
FIGS. 1A, 1B, and 1C depict respective front, back, and side views of an example handset of a mobile communication device in accordance with embodiments described herein.
Figure 1B:
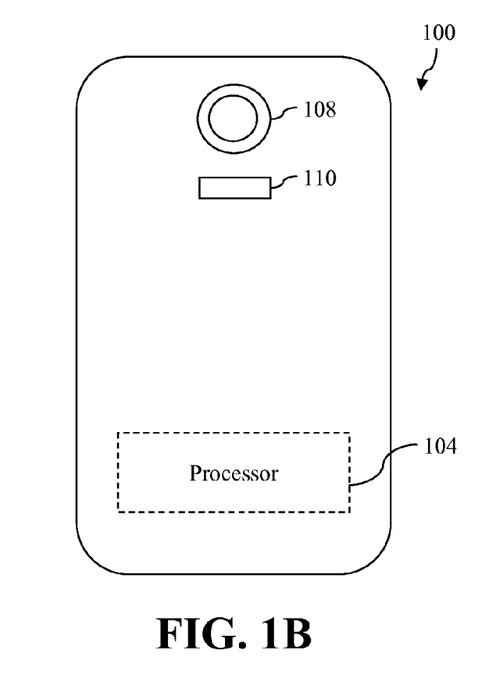
Figure 1C:
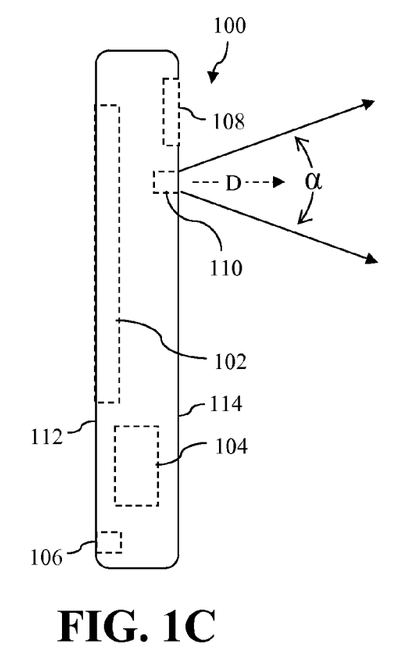

FIGS. 1A, 1B, and 1C depict respective front, back, and side views of an example handset 100 of a mobile communication device in accordance with embodiments described herein. For example, mobile communication device 100 may be a personal digital assistant, (PDA), a cellular telephone, a tablet computer, etc. As shown in FIG. 1A, a front portion of mobile communication device 100 includes a display 102 and a first sensor 106 (e.g., a first microphone). Display 102 is configured to display images to a user of mobile communication device 100. First sensor 106 is positioned to be proximate the user's mouth during regular use of mobile communication device 100. Accordingly, first sensor 106 is positioned to detect the user's speech. It can therefore be said that first sensor 106 is configured as a primary sensor during regular use of mobile communication device 100, though first sensor 106 may be configured as a secondary sensor for detecting reference noise in accordance with some example embodiments.

As shown in FIG. 1B, a back portion of mobile communication device 100 includes a camera 108 and a second sensor 110 (e.g., a second microphone). Camera 108 is configured to capture images. For example, such images may be displayed to the user by display 102. Second sensor 110 is positioned to be farther from the user's mouth during regular use than first sensor 106. For instance, second sensor 110 may be positioned as far from the user's mount during regular use as possible. It can therefore be said that second sensor 110 is configured as a secondary sensor during regular use of mobile communication device 100, though second sensor 110 may be configured as a primary sensor for detecting sound from a targeted object in accordance with some example embodiments.

By positioning first sensor 106 so that it is closer to the user's mouth than second sensor 110 during regular use, a magnitude of the user's speech that is detected by first sensor 106 is likely to be greater than a magnitude of the user's speech that is detected by second sensor 110. Furthermore, a magnitude of background noise that is detected by first sensor 106 is likely to be less than a magnitude of the background noise that is detected by second sensor 110.

As shown in FIG. 1C, mobile communication device 100 has a first surface 112 and a second surface 114. First and second surfaces 112 and 114 are shown in FIG. 1C to be opposing surfaces for illustrative purpose and are not intended to be limiting. For instance, first and second surfaces need not necessarily be opposing surfaces. Display 102 and first sensor 106 are shown to be configured on the first surface 112. Camera 108 and second sensor 110 are shown to be configured on the second surface 114. It will be recognized that mobile communication device 100 need not necessarily include display 102, camera 108, and/or second sensor 110.

Mobile communication device 100 includes a processor 104 that is configured to process audio signals, such as a first audio signal that is detected by first sensor 106, a second audio signal that is detected by second sensor 110, etc. to provide a noise-reduced representation of an audio signal. For example, the noise-reduced representation of the audio signal may be a noise-reduced representation of the first audio signal. In accordance with this example, processor 104 may subtract a representation of the second audio signal or a representation of another audio signal from a representation of the first audio signal to provide the noise-reduced representation of the first audio signal. In another example, the noise-reduced representation of the audio signal may be a noise-reduced representation of the second audio signal. In accordance with this example, processor 104 may subtract a representation of the first audio signal or a representation of another audio signal from a representation of the second audio signal to provide the noise-reduced representation of the second audio signal.

Second sensor 110 is shown in FIG. 1C to be configured as a directional sensor for illustrative purposes and is not intended to be limiting. A directional sensor is a sensor that emphasizes sound received from a specified direction more than sound received from directions other than the specified direction. For example, second sensor 110 may be configured to emphasize sound received from direction D, which is defined by angle α, more than sound received from directions other than direction D. In accordance with this example, direction D may correspond to a figurative line that bisects angle α. It will be recognized that second sensor 110 need not necessarily be a directional sensor. For instance, second sensor 110 may be an omni-directional sensor.

In accordance with an example embodiment, first sensor 106 is configured to detect a first audio signal for a first duration that includes a designated time period. Second sensor 110 is configured to detect a second audio signal for a second duration that includes the designated time period. In accordance with this embodiment, second sensor 110 is a directional sensor that emphasizes sound received from a specified direction more than sound received from directions other than the specified direction. Processor 104 is configured to compare a portion (e.g., all or less than all) of a representation of the first audio signal that corresponds to the designated time period and a portion (e.g., all or less than all) of a representation of the second audio signal that corresponds to the designated time period to determine a noise-reduced signal. The representation of the first audio signal may be unchanged from the first audio signal that is detected by first sensor 106. Alternatively, the representation of the first audio signal may be a modified (e.g., filtered) version of the first audio signal that is detected by first sensor 106. For instance, processor 104 may modify the first audio signal to provide the representation of the first audio signal. The representation of the second audio signal may be unchanged from the second audio signal that is detected by second sensor 110. Alternatively, the representation of the second audio signal may be a modified (e.g., filtered) version of the second audio signal that is detected by second sensor 110. For instance, processor 104 may modify the second audio signal to provide the representation of the second audio signal. The noise-reduced signal represents a difference between the portion of the representation of the first audio signal and the portion of the representation of the second audio signal.

In an aspect of the aforementioned embodiment, the first audio signal represents sound provided by the user. The second audio signal represents sound that is provided by a targeted noise source and that is received by second sensor 110 from the specified direction. Processor 104 is configured to subtract the portion of the representation of the second audio signal from the portion of the representation of the first audio signal to provide the noise-reduced signal.

In another aspect of the aforementioned embodiment, camera 108 is configured to capture an image of a targeted object. The first audio signal represents sound provided by objects other than the targeted object. The second audio signal represents sound that is provided by the targeted object and that is received by second sensor 110 from the specified direction. Processor 104 is configured to subtract the portion of the representation of the first audio signal from the portion of the representation of the second audio signal to provide the noise-reduced signal. For instance, processor 104 may subtract the portion of the representation of the first audio signal from the portion of the representation of the second audio signal to provide the noise-reduced signal in response to activation of camera 108 (e.g., in response to camera 108 being switched from an "off" state to an "on" state).

In yet another aspect of the aforementioned embodiment, second sensor 110 is an adaptable directional sensor. An adaptable directional sensor is a directional sensor having a specified direction that is adjustable. Processor 104 is configured to determine a location of an audio source based on sounds that are received by second sensor 110. Second sensor 110 is configured to set the specified direction to correspond to the location of the audio source.

First sensor 106 and second sensor 110 are shown to be positioned on the respective front and back portions of mobile communication device 100 (e.g., configured on the respective first and second surfaces 112 and 114) in FIGS. 1A, 1B, and 1C for illustrative purposes and are not intended to be limiting. Persons skilled in the relevant art(s) will recognize that first sensor 106 and second sensor 110 may be positioned in any suitable locations on mobile communication device 100. For example, first sensor 106 may be configured on a bottom surface or a side surface of mobile communication device 100. In another example, second sensor 110 may be configured on a top surface or a side surface of mobile communication device 100. Nevertheless, the effectiveness of some techniques described herein may be improved if first sensor 106 and second sensor 110 are positioned on mobile communication device 100 such that first sensor 106 is closer to a targeted audio source (e.g., the user's mouth during regular use of mobile communication device 100) than second sensor 110. The effectiveness of other techniques described herein may be improved if first sensor 106 and second sensor 110 are positioned on mobile communication device 100 such that second sensor 110 is closer to a targeted audio source (e.g., an object of which camera 108 captures image(s)) than first sensor 106.

One first sensor 106 is shown in FIGS. 1A and 1C for illustrative purposes and is not intended to be limiting. It will be recognized that mobile communication device 100 may include any number of primary sensors. One second sensor 110 is shown in FIGS. 1B and 1C for illustrative purposes and is not intended to be limiting. It will be recognized that mobile communication device 100 may include any number of secondary sensors.

In accordance with an embodiment, processor 104 is configured to switch first sensor 106 and second sensor 110 between a first mode of operation and a second mode of operation. The first mode is characterized by first sensor 106 being configured as a primary sensor to detect a first primary signal that represents speech of the user. The first mode is further characterized by second sensor 110 being configured as a secondary sensor to detect a first secondary signal that represents reference noise. The second mode is characterized by first sensor 106 being configured as a secondary sensor to detect a second secondary signal that represents reference noise. The second mode is further characterized by second sensor 110 being configured as a primary sensor to detect a second primary signal that represents sound from a targeted noise source. Processor 104 is configured to subtract a representation of the first secondary signal from a representation of the first primary signal to provide a noise-reduced first primary signal in response to first sensor 106 and second sensor 110 being switched from the second mode to the first mode.

Processor 104 is configured to subtract a representation of the second secondary signal from a representation of the second primary signal to provide a noise-reduced second primary signal in response to first sensor 106 and second sensor 110 being switched from the first mode to the second mode.

Figure 2:
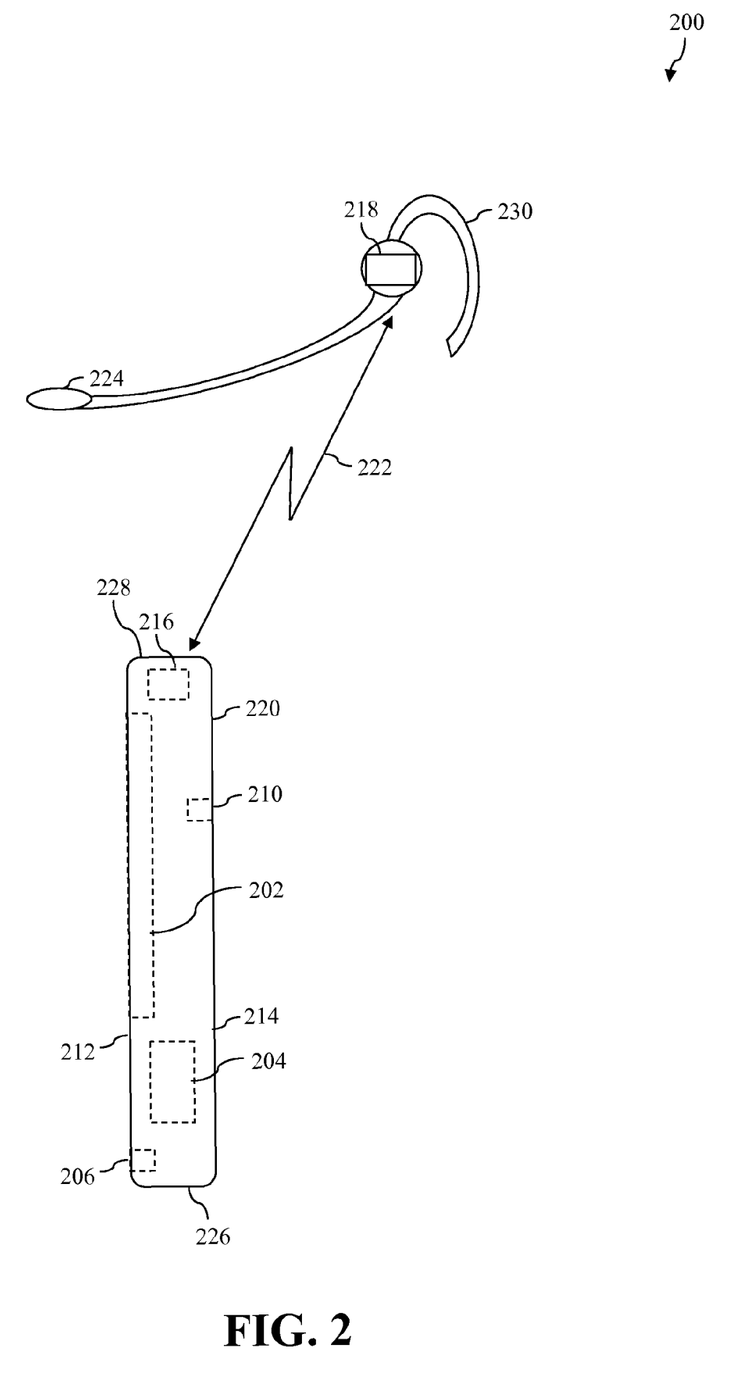
FIG. 2 is a block diagram of an example mobile communication device that includes a handset and a headset in accordance with an embodiment described herein.

In an aspect of the aforementioned embodiment, the first mode is further characterized by camera 108 being configured in an off state. The second mode is further characterized by camera 108 being configured in an on state to capture an image of the targeted noise source FIG. 2 is a block diagram of an example mobile communication device 200 that includes a handset 220 and a headset 230 in accordance with an embodiment described herein. As shown in FIG. 2, handset 220 and headset 230 are communicatively coupled via a connection 222. Connection 222 may be any suitable type of connection, such as a wireless (e.g., Bluetooth®) connection, a wired connection, etc.

Handset 220 includes a display 202, a processor 204, a first sensor 206, and a second sensor 210, which operate similarly to display 102, processor 104, first sensor 106, and second sensor 110, respectively, as described above with reference to FIGS. 1A, 1B, and 1C. It will be apparent to persons skilled in the relevant art(s) that handset 220 need not necessarily include second sensor 210. Handset 220 is shown in FIG. 2 to further include a first transceiver 216. First transceiver 216 is configured to provide representations of audio signals that are detected by first sensor 206 and/or second sensor 210 to headset 230 via connection 222. It will be recognized that processor 204 may process (e.g., digitize, filter, amplify, etc.) such audio signals to provide (e.g., generate) the aforementioned representations of the audio signals for provision by first transceiver 216. First transceiver 216 is further configured to receive representations of audio signals that are detected by third sensor 224 of headset 230. Third sensor 224 is described in further detail below.

Headset 230 includes third sensor 224 and a second transceiver 218. Third sensor is configured to detect audio signals. Third sensor 224 may be configured to be a primary sensor or a secondary sensor. For example, if headset 230 is positioned relatively near (e.g., proximate) a targeted audio source, such as the mouth of a user who is wearing headset 230, third sensor 230 is said to be configured as a primary sensor. In another example, if headset 230 is positioned relatively far from the targeted audio source, third sensor 230 is said to be configured as a secondary sensor.

Second transceiver 218 is configured to provide representations of audio signals that are detected by third sensor 224 to handset 220 via connection 222. It will be recognized that headset 230 may include a processor (not shown) for processing (e.g., digitizing, filtering, amplifying, etc.) such audio signals to provide (e.g., generate) the aforementioned audio signals for provision by second transceiver 218. Second transceiver 218 is further configured to receive representations of audio signals that are detected by first sensor 206 and/or second sensor 210 of handset 220.

In accordance with an example embodiment, third sensor 224 is configured to detect a first audio signal for a first duration that includes a designated time period. First sensor 206 and/or second sensor 210 is configured to detect a second audio signal for a second duration that includes the designated time period. Processor 204 is configured to compare a portion (e.g., all or less than all) of a representation of the first audio signal that corresponds to the designated time period and a portion (e.g., all or less than all) of a representation of the second audio signal that corresponds to the designated time period to determine a noise-reduced signal, which represents a difference between the portion of the representation of the first audio signal and the portion of the representation of the second audio signal. The representation of the first audio signal may be unchanged from the first audio signal that is detected by third sensor 224. Alternatively, the representation of the first audio signal may be a modified (e.g., filtered) version of the first audio signal that is detected by third sensor 224. For instance, processor 204 may modify the first audio signal to provide the representation of the first audio signal. The representation of the second audio signal may be unchanged from the second audio signal that is detected by first sensor 206 and/or second sensor 210. Alternatively, the representation of the second audio signal may be a modified (e.g., filtered) version of the second audio signal that is detected by first sensor 206 and/or second sensor 210. For instance, processor 204 may modify the second audio signal to provide the representation of the second audio signal.

In an aspect of the aforementioned embodiment, the first audio signal may represent sound provided by a targeted audio source. The targeted audio source may be a user of mobile communication device 200, for example. The second audio signal represents sound provided by audio sources other than the targeted audio source. Processor 204 may be configured to subtract the portion of the representation of the second audio signal from the portion of the representation of the first audio signal to provide the noise-reduced signal.

In accordance with this aspect, processor 204 may be further configured to determine whether a fidelity of the noise-reduced signal is less than a fidelity threshold. For example, the fidelity of the noise-reduced signal may correspond to a signal-to-noise ratio (SNR) of the noise-reduced signal. In another example, the fidelity threshold may correspond to a fidelity of the first audio signal. Processor 204 may be further configured to switch from providing the noise-reduced signal as an output signal to providing the first audio signal (e.g., a reconstruction of the first audio signal) as the output signal in a manner that is imperceptible by a user of the mobile communication device in response to the fidelity of the noise-reduced signal being less than the fidelity threshold. For instance, processor 204 may disable second sensor 210 in response to the fidelity of the noise-reduced signal being less than the fidelity threshold.

In another aspect of the aforementioned embodiment, the second audio signal may represent sound provided by a targeted audio source. The first audio signal may represent sound provided by audio sources other than the targeted audio source. Processor 204 may be configured to subtract the portion of the representation of the first audio signal from the portion of the representation of the second audio signal to provide the noise-reduced signal.

In accordance with this aspect, processor 204 may be further configured to determine whether a fidelity of the noise-reduced signal is less than a fidelity threshold. For example, the fidelity of the noise-reduced signal may correspond to a signal-to-noise ratio (SNR) of the noise-reduced signal. In another example, the fidelity threshold may correspond to a fidelity of the second audio signal. Processor 204 may be further configured to switch from providing the noise-reduced signal as an output signal to providing the second audio signal (e.g., a reconstruction of the second audio signal) as the output signal in a manner that is imperceptible by a user of the mobile communication device in response to the fidelity of the noise-reduced signal being less than the fidelity threshold. For instance, processor 204 may disable first sensor 206 in response to the fidelity of the noise-reduced signal being less than the fidelity threshold.

In yet another aspect of the aforementioned embodiment, multiple sensors (e.g., first sensor 206, second sensor 210, and/or other sensor(s)) in handset 220 may collaboratively detect the second audio signal. Such sensors may be configured on any suitable surfaces (e.g., any of surfaces 212, 214, 226, and/or 228) of handset 220. In FIG. 2, surfaces 212 and 214 are shown to be opposing surfaces, and surfaces 226 and 228 are shown to be opposing surfaces, for illustrative purposes and are not intended to be limiting. Each of surfaces 212 and 214 is said to be adjacent to surfaces 226 and 228. Each of surfaces 226 and 228 is said to be adjacent to surfaces 212 and 214. Each of the sensors in handset 220 may be any suitable type of sensor, including but not limited to a directional sensor (e.g., an adaptable directional sensor), a digital sensor, an analog sensor, etc.

Figure 3:
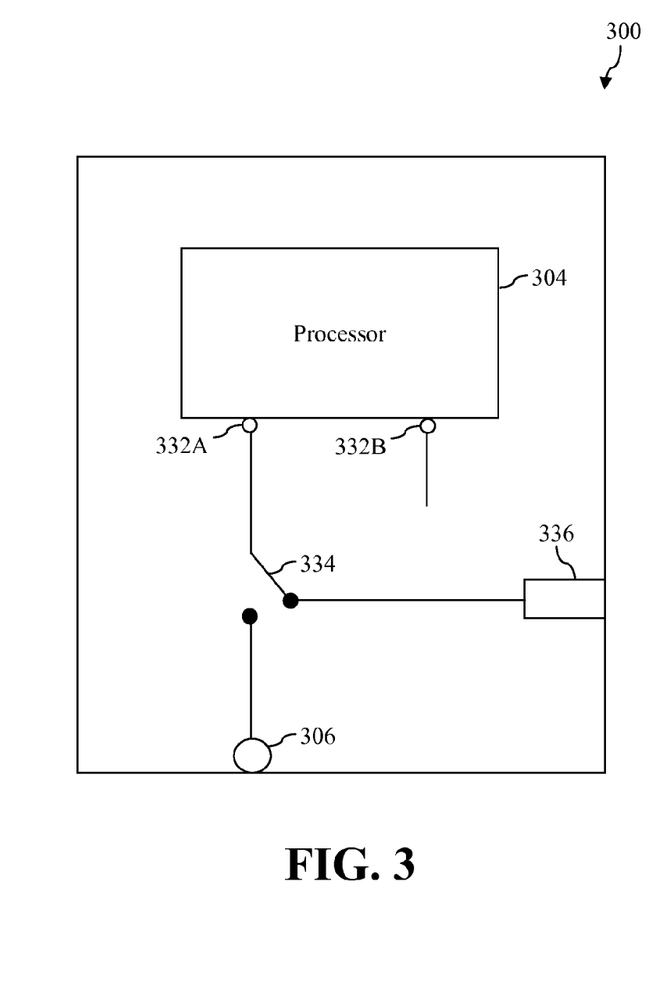
FIGS. 3-7 show example configurations of a handset of a mobile communication device in accordance with embodiments described herein.

FIGS. 3-7 show example configurations 300, 400, 500, and 600 of a handset of a mobile communication device in accordance with embodiments described herein. As shown in FIG. 3, configuration 300 includes a processor 304, a sensor 306, a switch 334, and a headset connector 336. Sensor 306 is configured to detect audio signals. Headset connector 336 is configured to receive a headset plug that is connected to a wired headset, thereby enabling representations of audio signals that are detected by the headset to be transferred from the headset to the handset for processing by processor 304. Processor 304 is shown to have a first sensor input element 332A and a second sensor input element 332B. Processor 304 processes (e.g., digitizes, amplifies, filters, etc.) audio signals that are received at first sensor input element 332A. Switch 334 is configured to switch between a first state and a second state. In the first state, switch 334 connects first sensor input element 332A to sensor 306 but not to headset connector 336. In the second state, switch 334 connects first sensor input element 332A to headset connector 336 but not to sensor 306. Accordingly, switch 334 switches to the first state in response to no headset plug being inserted into headset connector 336. Switch 334 switches to the second state in response to a headset plug being inserted into headset connector 336. Second sensor input element 532B is not used.

Figure 4:
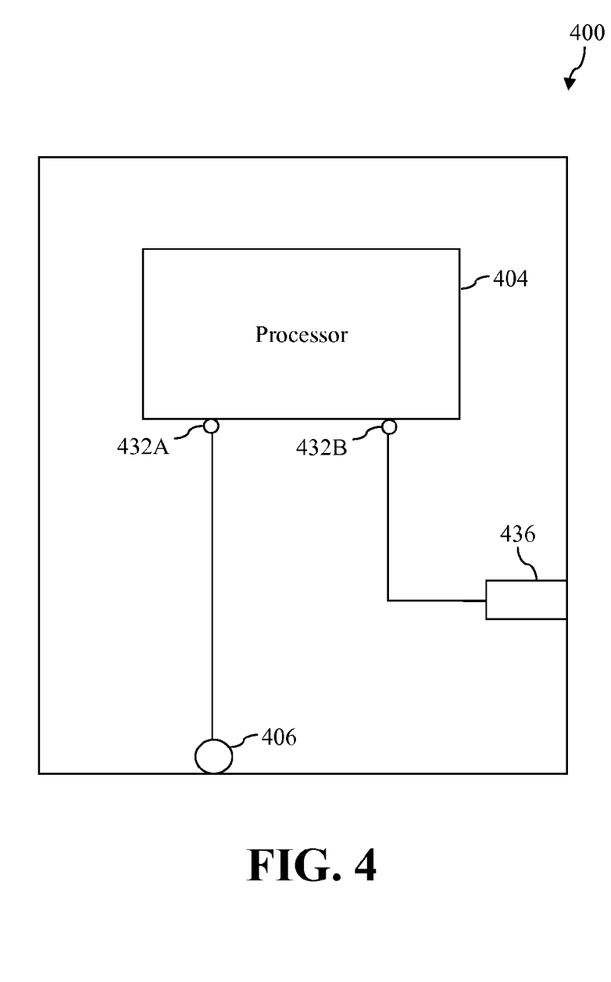

As shown in FIG. 4, configuration 400 includes a processor 404, a sensor 406, and a headset connector 436, which operate similarly to processor 304, sensor 306, and headset connector 336, respectively, as described above with reference to FIG. 3. However, configuration 400 differs from configuration 300 of FIG. 3 in that sensor 406 is coupled to first sensor input element 432A, and headset connector 436 is coupled to second sensor input element 432B. Processor 404 processes audio signals that are received at first sensor input element 432A and audio signals that are received at second sensor input element 432B. For instance, processor 404 may compare representations of the audio signals that are received at first sensor input element 432A and representations of the audio signals that are received at second sensor input element 432B to provide noise-reduced audio signals. The representations of the audio signals that are received at first sensor input element 432A may be unchanged from the audio signals that are received at first sensor input element 432A. Alternatively, the representations of the audio signals that are received at first sensor input element 432A may be modified (e.g., filtered) versions of the audio signals that are received at first sensor input element 432A. For instance, processor 404 may modify the audio signals that are received at first sensor input element 432A to provide the representations of the audio signals that are received at first sensor input element 432A. The representations of the audio signals that are received at second sensor input element 432B may be unchanged from the audio signals that are received at second sensor input element 432B. Alternatively, the representations of the audio signals that are received at second sensor input element 432B may be modified (e.g., filtered) versions of the audio signals that are received at second sensor input element 432B. For instance, processor 404 may modify the audio signals that are received at second sensor input element 432B to provide the representations of the audio signals that are received at second sensor input element 432B.

In an example embodiment, the handset, as depicted by configuration 400, is used for an audio event (e.g., a voice call), and a headset that is connected to the handset via headset connector 406 is used to detect reference noise. In accordance with this embodiment, processor 404 subtracts representations of the audio signals that are received from the headset via headset connector 436 from representations of the audio signals that are received from microphone 406 to provide the noise-reduced audio signals.

In another example embodiment, a headset that is connected to headset connector 436 is used for an audio event (e.g., a voice call), and microphone 406 is used to detect reference noise. In accordance with this embodiment, processor 404 subtracts the representations of the audio signals that are received from microphone 406 from the representations of the audio signals that are received from the headset via headset connector 436 to provide the noise-reduced audio signals.

Figure 5:
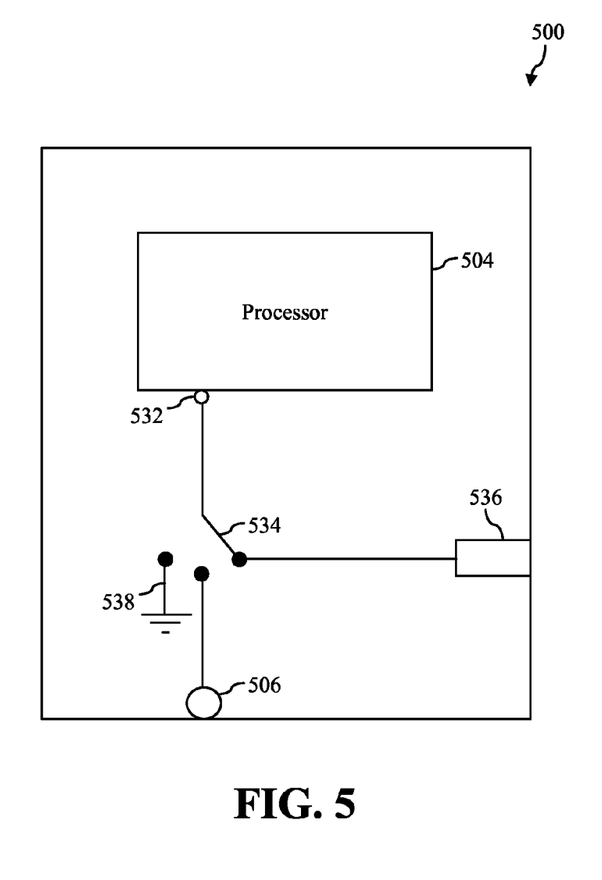

As shown in FIG. 5, configuration 500 includes a processor 504, a sensor 506, a switch 534, and a headset connector 536, which operate similarly to processor 304, sensor 306, switch 334, and headset connector 336, as described above with reference to FIG. 3. However, configuration 500 differs from configuration 300 of FIG. 3 in that processor 500 has a single sensor input element 532, and switch 534 is capable of switching between the first state, the second state, and a third state that corresponds to a wireless headset mode of operation. In the third state, switch 534 connects sensor input element 532 to neither sensor 506 nor headset connector 536. For instance, switch 534 may connect sensor input element 532 to a fixed potential (e.g., ground potential 538) in accordance with the third state, as shown in FIG. 5. Accordingly, switch 534 switches to the third state in response to initiation of the wireless headset mode of operation, regardless whether a headset plug is inserted into headset connector 536.

Figure 6:
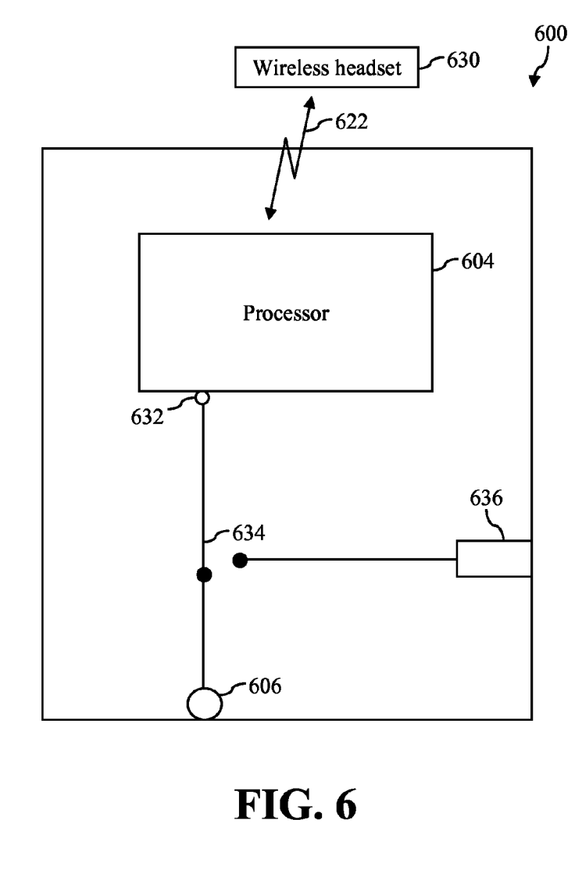

As shown in FIG. 6, configuration 600 includes a processor 604, a sensor 606, and a headset connector 636, which operate similarly to processor 304, sensor 306, and headset connector 336, respectively, as described above with reference to FIG. 3. Configuration 600 differs from configuration 500 of FIG. 5 in that switch 634 does not switch to the third state in response to initiation of the wireless headset mode of operation. For instance, switch 634 is capable of being in the first state or the second state during the wireless headset mode of operation. As shown in FIG. 6, wireless headset 630 is wirelessly connected to the handset, as depicted by configuration 600, via a wireless connection 622, simultaneously with sensor input element 632 being connected to microphone 606 or headset connector 636 via switch 634.

In an example embodiment, wireless headset 630 is used for an audio event (e.g., a voice call), and microphone 606 or a headset that is connected to headset connector 636 is used to detect reference noise. In accordance with this embodiment, processor 604 subtracts representations of the audio signals that are received from microphone 606 or the headset that is connected to headset connector 636 from representations of the audio signals that are received from wireless headset 630 to provide noise-reduced audio signals.

Figure 7:
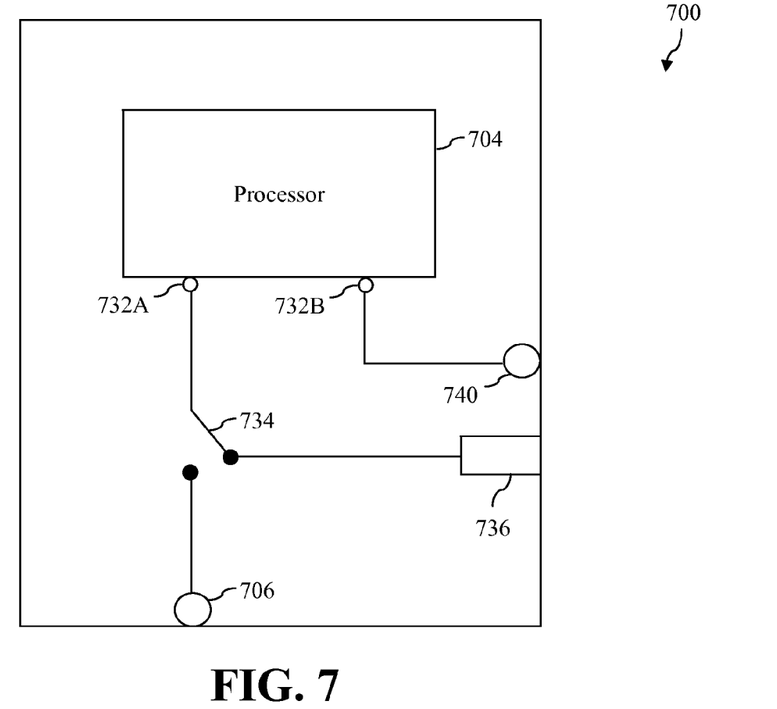

As shown in FIG. 7, configuration 700 includes a processor 704, a first sensor 706, a switch 734, and a headset connector 736, which operate similarly to processor 304, sensor 306, switch 334, and headset connector 336, as described above with reference to FIG. 3. However, configuration 700 differs from configuration 300 of FIG. 3 in that configuration 700 includes a second sensor 740, which is coupled to second sensor input element 732B. Processor 704 processes audio signals that are received at first sensor input element 732A and audio signals that are received at second sensor input element 732B. For instance, processor 704 may compare representations of the audio signals that are received at first sensor input element 732A and representations of the audio signals that are received at second sensor input element 732B to provide noise-reduced audio signals. The representations of the audio signals that are received at first sensor input element 732A may be unchanged from the audio signals that are received at first sensor input element 732A. Alternatively, the representations of the audio signals that are received at first sensor input element 732A may be modified (e.g., filtered) versions of the audio signals that are received at first sensor input element 732A. For instance, processor 704 may modify the audio signals that are received at first sensor input element 732A to provide the representations of the audio signals that are received at first sensor input element 732A. The representations of the audio signals that are received at second sensor input element 732B may be unchanged from the audio signals that are received at second sensor input element 732B. Alternatively, the representations of the audio signals that are received at second sensor input element 732B may be modified (e.g., filtered) versions of the audio signals that are received at second sensor input element 732B. For instance, processor 704 may modify the audio signals that are received at second sensor input element 732B to provide the representations of the audio signals that are received at second sensor input element 732B.

In an example embodiment, second sensor 740 is used for an audio event (e.g., a voice call), and a headset that is connected to headset connector 706 is used to detect reference noise. In accordance with this embodiment, processor 704 subtracts representations of the audio signals that are received from the headset via headset connector 736 from representations of the audio signals that are received from second sensor 740 to provide the noise-reduced audio signals.

In another example embodiment, a headset that is connected to headset connector 736 is used for an audio event (e.g., a voice call), and second sensor 740 is used to detect reference noise. In accordance with this embodiment, processor 704 subtracts the representations of the audio signals that are received from second sensor 740 from the representations of the audio signals that are received from the headset via headset connector 736 to provide the noise-reduced audio signals. In an aspect, switch 734 is capable of switching between coupling first sensor input element 732A to headset connector 736 and coupling first sensor input element 732A to first sensor 706 (e.g., on the fly) without decreasing a fidelity of the noise-reduced audio signals.

Figure 8:
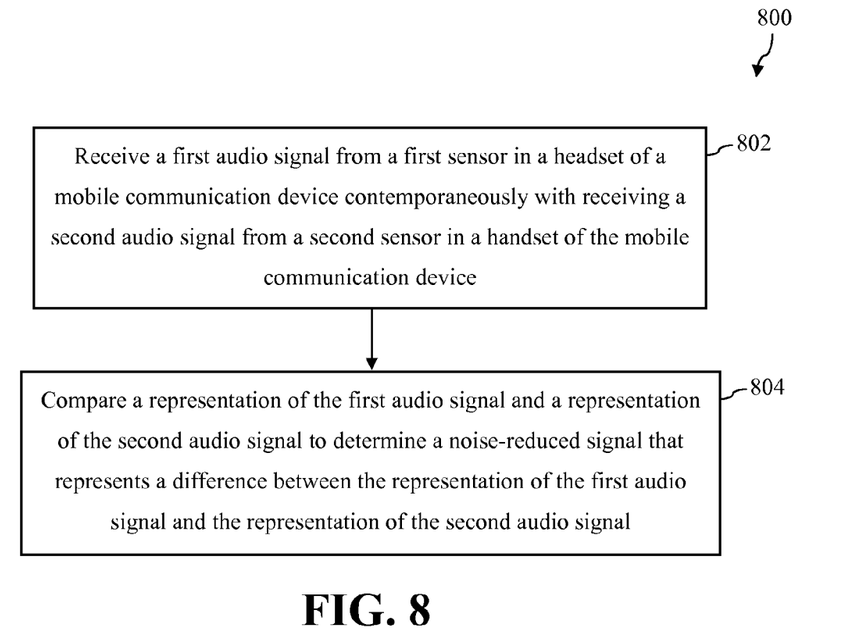
FIG. 8 depicts a flowchart of an example method for using sensors for noise reduction in a mobile communication device in accordance with an embodiment described herein.

FIG. 8 depicts a flowchart 800 of an example method for using sensors for noise reduction in a mobile communication device in accordance with an embodiment described herein. The method of flowchart 800 will now be described in reference to certain elements of example mobile communication device 200 as described above in reference to FIG. 2. However, the method is not limited to that implementation.

As shown in FIG. 8, flowchart 800 starts at step 802. In step 802, a first audio signal from a first sensor in a headset of a mobile communication device and a second audio signal from a second sensor in a handset of the mobile communication device are received contemporaneously. The headset and the handset are communicatively coupled (e.g., via a wired or wireless connection). In an example implementation, processor 204 receives the first audio signal from sensor 224 in headset 230 contemporaneously with receiving the second audio signal from sensor 206 and/or sensor 210 in handset 220.

At step 804, a representation of the first audio signal and a representation of the second audio signal are compared to determine a noise-reduced signal that represents a difference between the representation of the first audio signal and the representation of the second audio signal. The representation of the first audio signal may be unchanged from the first audio signal that is received from the first sensor. Alternatively, the representation of the first audio signal may be a modified (e.g., filtered) version of the first audio signal that is received from the first sensor. The representation of the second audio signal may be unchanged from the second audio signal that is received from the second sensor(s). Alternatively, the representation of the second audio signal may be a modified (e.g., filtered) version of the second audio signal that is received from the second sensor(s). In an example implementation, processor 204 compares the representation of the first audio signal and the representation of the second audio signal to determine the noise-reduced signal.

Each of processors 104, 204, 304, 404, 504, 604, and 704 is described herein as being included in a handset of a mobile communication device for illustrative purposes and is not intended to be limiting. For example, any of processors 104, 204, 304, 404, 504, 604, and/or 704 (or a portion thereof) may be included in a headset that is communicatively coupled to the handset. In accordance with this example, the handset may provide representations of audio signals that are detected by sensor(s) in the handset to the headset for processing in accordance with the noise-reduction techniques described herein. For instance, the headset may compare the representations of the audio signals that are received from the handset to representations of audio signals that are detected by sensor(s) in the headset to provide noise-reduced signals.

The invention can be put into practice using software, firmware, and/or hardware implementations other than those described herein. Any software, firmware, and hardware implementations suitable for performing the functions described herein can be used.

III. Conclusion

While various embodiments have been described above, it should be understood that they have been presented by way of example only, and not limitation. It will be understood by those skilled in the relevant art(s) that various changes in form and details may be made to the embodiments described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A mobile communication device comprising:
a headset that includes a first sensor configured to detect a first audio signal for a first duration that includes a designated time period; and
a handset that is communicatively coupled to the headset, the handset comprising:
at least one second sensor configured to detect a second audio signal for a second duration that includes the designated time period; and
a processor that is configured to compare a portion of a representation of the first audio signal that corresponds to the designated time period and a portion of a representation of the second audio signal that corresponds to the designated time period to determine a noise-reduced signal, the noise-reduced signal representing a difference between the portion of the representation of the first audio signal and the portion of the representation of the second audio signal, the processor further configured to determine whether a fidelity of the noise-reduced signal is less than a fidelity threshold, the processor further configured to switch from providing the noise-reduced signal as an output signal to providing a designated signal as the output signal and to cause at least one designated sensor to be disabled in response to the fidelity of the noise-reduced signal being less than the fidelity threshold, the designated signal being the first audio signal or the second audio signal, the at least one designated sensor being the first sensor or the at least one second sensor, and the at least one designated sensor configured to detect the first audio signal or the second audio signal that is not the designated signal.

2. The mobile communication device of claim 1, wherein the first audio signal represents sound provided by a targeted audio source;
wherein the second audio signal represents sound provided by audio sources other than the targeted audio source; and
wherein the processor is configured to subtract the portion of the representation of the second audio signal from the portion of the representation of the first audio signal to provide the noise-reduced signal.

3. The mobile communication device of claim 1, wherein the fidelity threshold corresponds to a fidelity of the first audio signal.

4. The mobile communication device of claim 1, wherein the second audio signal represents sound provided by a targeted audio source;
wherein the first audio signal represents sound provided by audio sources other than the targeted audio source; and
wherein the processor is configured to subtract the portion of the representation of the first audio signal from the portion of the representation of the second audio signal to provide the noise-reduced signal.

5. The mobile communication device of claim 4, wherein the processor is further configured to determine whether a fidelity of the noise-reduced signal is less than a fidelity threshold; and
wherein the processor is further configured to switch from providing the noise-reduced signal as the output signal to providing the designated signal as the output signal in response to the fidelity of the noise-reduced signal being less than the fidelity threshold, the designated signal being the second audio signal.

6. The mobile communication device of claim 5, wherein the fidelity threshold corresponds to a fidelity of the second audio signal.

7. The mobile communication device of claim 1, wherein the handset includes first and second opposing surfaces;
wherein the at least one second sensor includes first and second subsets of a plurality of sensors that collaboratively detect the second audio signal;
wherein the first subset of the plurality of sensors is configured on the first surface; and
wherein the second subset of the plurality of sensors is configured on the second surface.

8. The mobile communication device of claim 1, wherein the handset includes first and second opposing surfaces and a third surface that is adjacent to the first and second opposing surfaces;
wherein the at least one second sensor includes first and second subsets of a plurality of sensors that collaboratively detect the second audio signal;
wherein the first subset of the plurality of sensors is configured on the first surface or the second surface; and
wherein the second subset of the plurality of sensors is configured on the third surface.

9. A method comprising:
receiving a first audio signal from a first sensor in a headset of a mobile communication device contemporaneously with receiving a second audio signal from a second sensor in a handset of the mobile communication device that is communicatively coupled to the headset;
comparing a representation of the first audio signal and a representation of the second audio signal to determine a noise-reduced signal, the noise-reduced signal representing a difference between the representation of the first audio signal and the representation of the second audio signal;
determining that a fidelity of a designated signal is greater than a fidelity of the noise-reduced signal, the designated signal being the first audio signal or the second audio signal; and
switching from providing the noise-reduced signal as an output signal to providing the designated signal as the output signal and causing a designated sensor to be disabled in response to determining that the fidelity of the designated signal is greater than the fidelity of the noise-reduced signal, the designated sensor being the first sensor or the second sensor, and the designated sensor configured to detect the first audio signal or the second audio signal that is not the designated signal.

10. The method of claim 9, wherein the first audio signal represents sound provided by a targeted audio source;
wherein the second audio signal represents sound provided by audio sources other than the targeted audio source; and
wherein comparing the representation of the first audio signal and the representation of the second audio signal comprises:
subtracting the representation of the second audio signal from the representation of the first audio signal to provide the noise-reduced signal.

11. The method of claim 9, wherein the second audio signal represents sound provided by a targeted audio source;
wherein the first audio signal represents sound provided by audio sources other than the targeted audio source; and
wherein comparing the representation of the first audio signal and the representation of the second audio signal comprises:
subtracting the representation of the first audio signal from the representation of the second audio signal to provide the noise-reduced signal.

12. The method of claim 11, further comprising:
determining that a fidelity of the second audio signal is greater than a fidelity of the noise-reduced signal; and
switching from providing the noise-reduced signal as the output signal to providing the designated signal as the output signal in response to determining that the fidelity of the second audio signal is greater than the fidelity of the noise-reduced signal, the designated signal being the second audio signal.

13. A handset of a mobile communication device, the handset comprising:
a first sensor configured to detect a first audio signal; and
a processor configured to subtract a representation of a second audio signal received from a remote device located remotely from the handset from a representation of the first audio signal to provide a noise-reduced signal, the processor further configured to determine whether a fidelity of the noise-reduced signal is less than a fidelity threshold, the processor further configured to switch from providing the noise-reduced signal as an output signal to providing the first audio signal as the output signal and to cause a second sensor that detects the second audio signal at the remote device to be disabled in response to the fidelity of the noise-reduced signal being less than the fidelity threshold.

14. A headset of a mobile communication device comprising:
a first sensor configured to detect a first audio signal for a first duration that includes a designated time period; and
a processor configured to compare a portion of a representation of the first audio signal that corresponds to the designated time period and a portion of a representation of a second audio signal, which is received from and detected by a second sensor of a remote device located remotely from the headset, that corresponds to the designated time period to determine a noise-reduced signal, the noise-reduced signal representing a difference between the portion of the representation of the first audio signal and the portion of the representation of the second audio signal, wherein the processor is further configured to determine whether a fidelity of the noise-reduced signal is less than a fidelity threshold and switch from providing the noise-reduced signal as an output signal to providing the first audio signal as the output signal in response to the fidelity of the noise-reduced signal being less than the fidelity threshold.

15. The headset of claim 14, wherein the processor is configured to subtract the portion of the representation of the second audio signal from the portion of the representation of the first audio signal to provide the noise-reduced signal.

16. The headset of claim 14, wherein the processor is further configured to determine a location of an audio source based on sounds that are received by the second sensor; and
wherein the second sensor is a directional sensor that emphasizes sound received from a specified direction more than sound received from directions other than the specified direction, the second sensor configured to set the specified direction to correspond to the location of the audio source.

17. The handset of claim 13, wherein the fidelity threshold corresponds to a fidelity of the first audio signal.

18. The headset of claim 14, wherein the fidelity threshold corresponds to a fidelity of the first audio signal.

19. The headset of claim 14, wherein the processor is further configured to cause the second sensor to be disabled in response to the fidelity of the noise-reduced signal being less than the fidelity threshold.

20. The handset of claim 13, wherein the handset includes first and second opposing surfaces;
wherein the first sensor includes first and second subsets of a plurality of sensors that collaboratively detect the first audio signal;
wherein the first subset of the plurality of sensors is configured on the first surface; and wherein the second subset of the plurality of sensors is configured on the second surface.

\* \* \* \* \*